United States Patent [19]

Engel

[11] 4,040,871
[45] Aug. 9, 1977

[54] METHOD FOR PRODUCING AN INDIVIDUAL FIN-FREE SPOT SCARFING CUT

[75] Inventor: Stephen August Engel, Shenorock, N.Y.

[73] Assignee: Union Carbide Corporation, New York, N.Y.

[21] Appl. No.: 607,888

[22] Filed: Aug. 26, 1975

[51] Int. Cl.² .............................................. B23K 7/06
[52] U.S. Cl. ................................................... 148/9.5
[58] Field of Search ........................................ 148/9.5

[56] References Cited

U.S. PATENT DOCUMENTS

| 1,958,044 | 5/1934 | Hendricks | 148/9.5 |
| 2,125,179 | 7/1938 | Doyle | 148/9.5 |
| 2,157,095 | 5/1939 | Bucknam | 148/9.5 |
| 2,290,295 | 7/1942 | Scheller | 148/9.5 |
| 2,309,096 | 1/1943 | Bucknam | 148/9.5 |
| 2,622,048 | 12/1952 | Moesinger, Jr. | 148/9.5 |
| 2,664,368 | 12/1953 | Babcock et al. | 148/9.5 |
| 2,674,210 | 4/1954 | Holub et al. | 148/9.5 |
| 2,838,431 | 6/1958 | Allmang et al. | 148/9.5 |
| 3,231,431 | 1/1966 | Allmang | 148/9.5 |
| 3,764,122 | 10/1973 | Lytle | 148/9.5 |

FOREIGN PATENT DOCUMENTS

| 48-34503 | 10/1973 | Japan |
| 47-31066 | 9/1972 | Japan |
| 46-14126 | 5/1971 | Japan |

Primary Examiner—W. Stallard
Attorney, Agent, or Firm—Lawrence G. Kastriner; Warrick E. Lee, Jr.

[57] ABSTRACT

A method for producing an individual, fin-free, spot scarfing cut on the surface of a workpiece characterized by directing at the spot to be scarfed, which has first been brought to a molten state, an oxygen stream at an inclined angle to the work surface, the intensity of said oxygen stream being gradually diminished toward its lateral edges so that the flow of oxygen at the edges of said stream is insufficient to scarf the workpiece, but sufficient to oxidize molten metal at the edges of the scarfing reaction zone, thereby preventing molten metal from solidifying on the work surface along the edges of the scarfing cut in an unoxidized state.

4 Claims, 18 Drawing Figures

METHOD FOR PRODUCING AN INDIVIDUAL FIN-FREE SPOT SCARFING CUT

BACKGROUND

This invention relates to thermochemical removal of metal from metal bodies, commonly called scarfing, and more specifically, to a spot scarfing method capable of producing a fin-free cut, particularly suited for mechanized use. Spot scarfing is a process for scarfing those specific areas of the surface of a workpiece which contain defects, as distinguished from desurfacing the entire surface.

The problems associated with surface conditioning in the steel industry have underscored the need for mechanized spot scarfing of metal bodies, such as steel slabs and blooms. When such a body contains only a few minor defects, scarfing its full surface, i.e., removing a relatively uniform surface layer of metal from the entire work surface, to remove these defects wastes clean, defect-free metal. When the metal body contains many defects, it is common practice to first desurface the entire body, regulating the depth of scarfing cut to remove the majority of the defects, and then to spot scarf the body to remove the remaining, deeper-lying defects. This practice is employed because regulating the depth of the desurfacing cut to remove all, including the deepest, defects would unnecessarily waste good metal. Therefore, spot scarfing, and in particular, mechanized spot scarfing is important for achieving maximum economy in steel conditioning.

One of the major problems associated with spot scarfing metal bodies with conventional scarfing nozzles, either in a mechanized process or by hand scarfing, is the formation of "fins" at the edges of the scarfing pass. A "fin" may be defined as a thin flash or wash of pure or slightly oxidized metal solidly joined to the boundary of a scarfing cut at the surface of the metal workpiece. Such fins must be removed before the workpiece is subsequently rolled, or the fins themselves become undesirable defects. Insofar as spot scarfing is concerned, a fin is formed when molten metal is driven laterally out of the primary reaction zone by the scarfing oxygen stream where the molten metal resolidifies and adheres to the workpiece at the edges of the scarfing cut.

Conventional scarfing processes heretofore used for spot scarfing have employed a wide variety of nozzles. The most common shapes of the oxygen discharge orifice have been either round (such as shown in U.S. Pat. No. 2,309,096 to Bucknam et al.), slotted with round ends (such as shown in U.S. Pat No. 2,664,368 to Babcock et al.), rectangular (as shown, for example, In U.S. Pat. No. 2,622,048 to Moesinger), or a continuous slot (described in U.S. Pat. Nos. 2,838,431 and 3,231,431 to Allmang et al.). These types of nozzles all produce fins from the primary reaction zone. In an effort to minimize the problem of fin formation, it has been a practice to use the above nozzles in conjunction with jets of air, water or the like which are directed at the incipiently forming fins so as to push the fin-forming molten metal back into the reaction zone. Thus, for example, Japanese Utility Model Application Publication No. 31066/1972 discloses blowing a stream of high pressure air or oxygen for this purpose, while Japanese Patent Application Publication No. 14126/1971 discloses the use of a water jet for removing residual slag from the edges of a scarfing cut. This procedure has met with some degree of success in that it is possible to achieve a relatively shallow fin-free cut with a rectangular or continuous slot nozzle operating within a narrow range of scarfing oxygen pressure and scarfing speeds. However, the control of process variables to minimize fin formation by this technique becomes so critical, the scarfing reaction so unstable, and the depth of the cut so shallow, that such a scarfing operation is commercially impractical.

Other methods have been employed to compensate for the basic inability of conventional scarfing nozzles to produce a fin-free cut. These include directing a single oxygen nozzle at an angle relative to the scarfing path as disclosed, for example, In U.S. Pat. No. 2,125,179 to Doyle, and inclining two or more nozzles towards each other so that their scarfing oxygen streams intersect essentially on the center line of the desired cut path, a technique shown in Doyle and in U.S. Pat. No. 2,157,095 to Bucknam. Using a single inclined nozzle as described in Doyle avoids fin formation on the near side of a cut but aggravates fin formation on the far side, and results in a non-symmetrical cut cross-section. Two mutually inclined nozzles as described above can be employed successfully to make a fin-free cut, but the cut contour is characterized by a deep groove along the path of intersection of the oxygen streams and results in an undesirable surface contour for spot scarfing.

OBJECTS

Accordingly, it is an object of the present invention to provide a method of spot scarfing a metal workpiece while preventing the formation of fins along the boundaries of the scarfing cut.

It is another object of the invention to provide a spot scarfing method which is capable of producing a fin-free cut over a wide range of scarfing speeds and depths of metal removal, i.e., at commercially practical scarfing conditions.

SUMMARY OF THE INVENTION

The objects set forth above and others which will be readily apparent to those skilled in the art are achieved by the present invention which comprises:
  in a process for machine scarfing individual defects from the surface of a metal body, wherein a sheet-like stream of oxygen is directed obliquely against a reaction zone of molten metal to produce a thermochemical reaction thereon, and wherein relative movement is produced between the oxygen stream and the metal surface to continue the reaction along the length of the metal surface to produce the desired individual scarfing cut, the improvement comprising: preventing the formation of fins along the edges of the scarfing cut by restricting the flow of said oxygen at the edges of said stream so as to gradually diminish the intensity of the oxygen stream at the edges thereof to such an extent that the flow of oxygen at the edges of the stream is insufficient to produce a scarfing reaction on the metal surface, but sufficient to oxidize any molten metal at the edges of the scarfing reaction zone, thereby preventing said molten metal from solidifying and adhering to the surface of said metal body along the edges of the scarfing cut in an unoxidized state and thereby producing a fin-free scarfing cut narrower than the width of the oxygen stream.

In a preferred embodiment of the invention, fin formation is prevented by directing a stream of scarfing oxygen through a nozzle terminating in a discharge orifice characterized by having a width greater than its maximum height, and wherein said height gradually decreases from a maximum at the center of the orifice to zero at the edges.

DRAWINGS

DETAILED DESCRIPTION OF THE INVENTION

Figure 1:
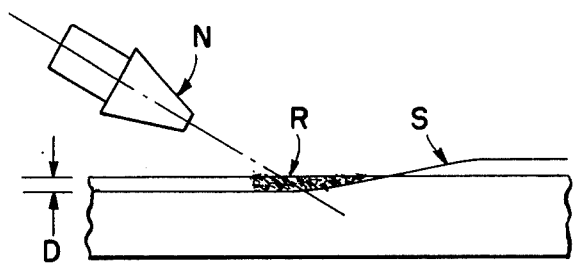
FIG. 1 is a schematic drawing, in side view, of a spot scarfing nozzle used in accordance with the present invention, illustrating the metal workpiece after it has been preheated and the molten slag-iron puddle formed.

The present invention is capable of producing a fin-free cut at practical scarfing conditions, namely, at oxygen flows capable of removing metal to depths of from about 1/16 to ¼ inch or more and at scarfing speeds of from 20 to 80 FPM on cold steel. Thus, unlike prior art scarfing methods which can be made to scarf with little fin formation under carefully controlled conditions over a very narrow operating range, the process of the invention can be operated over a wide range of scarfing speeds and depths of cut. An instantaneous spot scarfing start can be advantageously achieved by combining the scarfing process of the present invention with the flying start scarfing method disclosed in my copending U.S. patent application No. 540,455, filed Jan. 13, 1975, now U.S. Pat. No. 3,966,503.

One of the critical features of the invention is that the flow of oxygen discharged from the ends of the nozzle be insufficient to sustain a scarfing reaction along the boundaries of the scarfing cut, but capable of oxidizing molten metal before it solidifies. One preferred shape of nozzle orifice for use in the present invention is a "diamond shaped" parallelogram, illustrated in FIGS. 6 and 7, wherein the height of the orifice opening decreases linearly from a maximum at the center to zero at both edges. The ratio of nozzle width to maximum nozzle height in such orifice is preferably between 4:1 and 20:1. For purposes of convenience, the above-described orifice shape is referred to throughout the specification as being "diamond shaped". As used herein, the term "orifice height" refers to the distance between the upper and lower boundaries of the discharge orifice which is perpendicular to the "orifice width", the latter being the distance between the edges of the orifice where the orifice height is zero.

It is to be understood, however, that the critical feature of the nozzle of the invention, namely, the decreasing height of the discharge orifice toward the edges can be produced with nozzle openings other than a "diamond shaped" orifice. Thus, for example, the nozzle orifice may have a center section defined by parallel upper and lower sides, illustrated in FIGS. 12 and 13, such that the height of the orifice is constant over a relatively wide center section of the nozzle opening, and two end sections wherein the orifice height gradually decreases to zero at the ends. Alternatively, the center section may have an irregular shape as described in greater detail hereafter. A nozzle such as described above can be made to scarf any desired width by varying the dimension of the center section so that the width of the center section and the two end sections correspond to the desired scarfing pass width, while retaining its ability to scarf fin-free, the characteristic result of the present invention. As used herein, the "height of the end section" refers to the orifice height at the boundary between the end section and the center section; said boundary being defined by a line, perpendicular to the orifice width, beyond which the orifice height as viewed from the edge of the orifice in the direction towards the center, remains constant or begins to decrease, but which in no case is more than 2 inches from the edge of the orifice. That is, the boundaries of the end sections, as defined herein, are always 2 inches or less from the respective edges of the orifice, and hence the "width of the end section" can be no greater than 2 inches. This upper limit defines the critical region of the end section beyond which the shape of the discharge orifice has markedly less effect on the ability of the nozzle to scarf fin-free.

Figure 2:
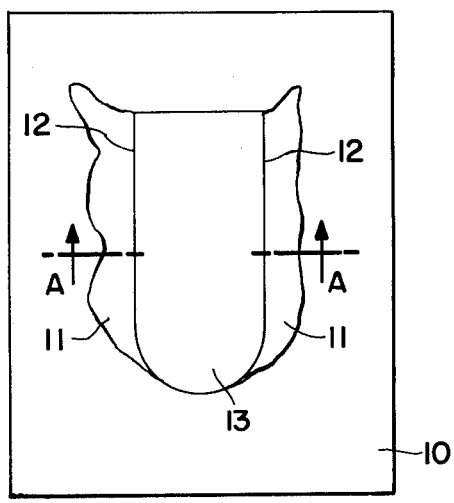
FIG. 2 is a top view of a steel slab which has been spot scarfed with a conventional nozzle.
Figure 3:
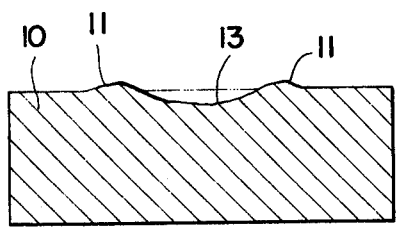
FIG. 3 is a cross-sectional view of FIG. 2 taken along lines A—A.

Referring to FIG. 1, a spot scarfing nozzle N is shown producing a cut of depth D on workpiece M. The zone of primary reaction between the cutting oxygen stream issuing from scarfing nozzle N, and workpiece M is shown as R. The scarfing puddle generated by the reaction is shown as S. During a typical scarfing pass, molten material from puddle S is driven out of reaction zone R to the edges of the scarfing cut. If nozzle N is a conventional round, slotted or rectangular shaped nozzle, the melt thus blown aside would subsequently resolidify in almost pure or unoxidized form, adhering to the workpiece 10, as shown in FIGS. 2 and 3, along the boundaries 12 of scarfing cut 13 to form fins 11. Fins 11 must thereafter be removed before rolling.

It has been found that the formation of fins under ordinary scarfing conditions (i.e., at practical depths of metal removal and scarfing speeds) is attributable to molten metal being forced laterally beyond the edges of the scarfing cut by the scarfing oxygen stream. The impact of the oxygen stream on the workpiece results in metal being pushed forward in the direction of the scarfing path, as well as laterally in the direction of the cut boundaries, the relative force vectors being determined by variables such as the flow profile of the oxygen stream, scarfing speed, and scarfing oxygen velocity. At commercially practical scarfing conditions, the oxygen flow profile is critical in determining the nature of the scarfing cut. The critical requirement for a fin-free cut is to provide a gradual reduction of flow at the edges of the oxygen stream to correspondingly reduce the amount of metal removed. As the oxygen flow at the edges of the stream is gradually reduced, a point is reached where the oxygen flow is incapable of maintaining the scarfing reaction, but is sufficient for preserving the forward component of flow of the central portion of the oxygen stream and minimizing the tendency of said central portion to laterally expand and push an inordinate amount of molten metal from the reaction zone on to the adjacent unscarfed metal. If the intensity of the oxygen stream is gradually reduced to near zero at the edges in accordance with the invention, any molten metal which is forced beyond the scarfing cut boundaries will be completely oxidized by the reduced oxygen flow at the edges of the stream. Thus, the resultant fin-free cut produced by the present invention is characteristically narrower than the width of the oxygen stream at its discharge orifice.

Figure 8:
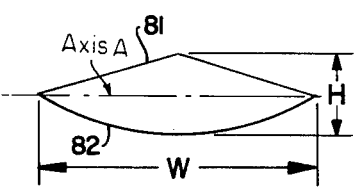
Figure 18:
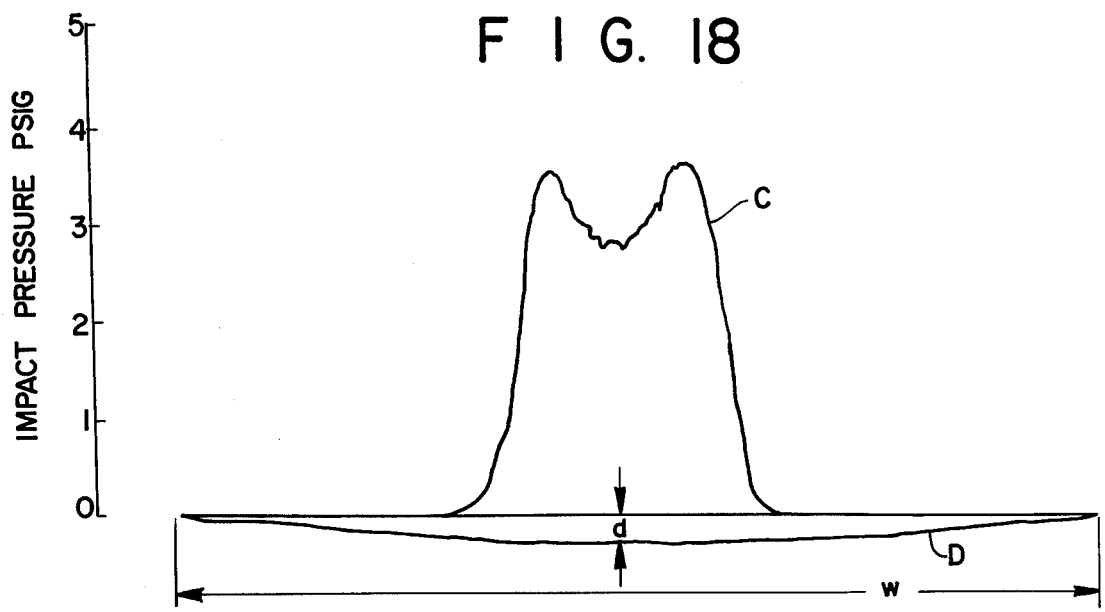
FIGS. 17 and 18 are plots of impact pressure (measured along the horizontal center line of the orifice) versus distance (relative to the vertical center line of the orifice) for producing fin-free and fin-producing cuts respectively. The depth of the scarfing cut corresponding to each of the pressure plots is also shown.
Figure 17:
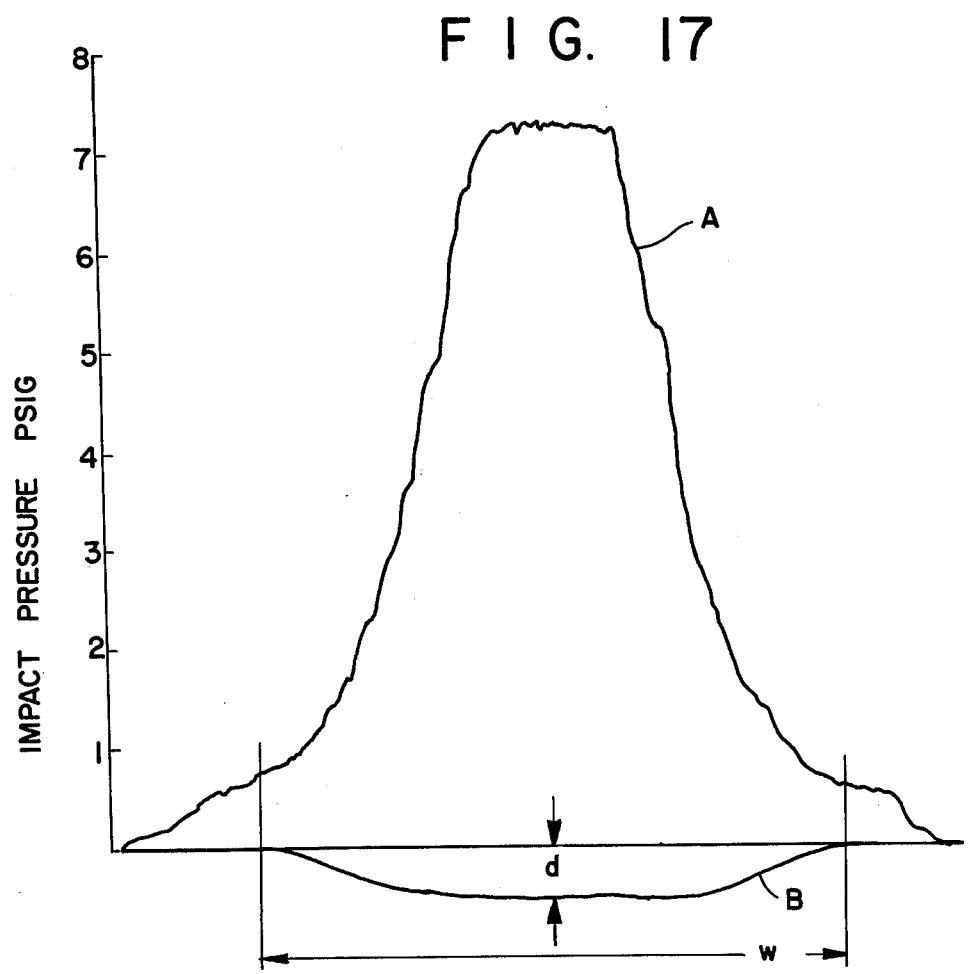

Typical impact pressure profiles for fin-producing and fin-free scarfing streams are shown in FIGS. 17 and 18. The impact pressures were measured along the horizontal center line of the orifice. Flow profile A of FIG. 17 characterizes the impact pressure (or flow) produced by a nozzle having a discharge orifice such as shown in FIG. 8, i.e., a nozzle which produces a fin-free cut; the nozzle width being 6 inches and the maximum height at the center, ¼ inch. Spot scarfing of a workpiece was carried out with the aforesaid nozzle at a scarfing speed of 30 ft/min and a scarfing angle of 30° between the inclined nozzle and the workpiece. The scarfing nozzle was maintained at a distance of 1⅜ inches above the workpiece as measured from the horizontal center line of the orifice. The operating conditions corresponding to the flow profile A were an oxygen nozzle inlet pressure of 6 psig, a scarfing oxygen flow of 46,000 SCFH and an oxymetal factor of 5.3 cu. ft. of oxygen/lb of metal removed. The gradual reduction of flow from the center of profile A toward the edges is characteristic of a scarfing stream which produces a fin-free cut; the resulting scarfing cut being shown as cut B having a width W of 4 13/16 inches and a depth $d$ of 0.40 inch. Fin-free cut B is characteristically smaller than the width of the discharge orifice.

In contrast thereto, profile C, produced by a 2.067 ID round bore nozzle, typifies the flow profile produced by a conventional scarfing oxygen stream wherein the flow of oxygen drops abruptly to zero at the edges, causing a ridge of unoxidized metal or fins such as shown in FIGS. 2 and 3 to form along the boundaries of the cut. Spot scarfing of the workpiece was carried out with the aforesaid round bore nozzle at the identical scarfing speed and angle used to produce scarfing cut B of FIG. 17, at an oxygen inlet pressure of 1.25 inches water, an oxygen flow of 44,000 SCFH and an oxy-metal factor of 5.25. The resulting scarfing cut D having a width W of 7 13/16 inches and a depth $d$ of 0.230 inch is typically wider than the width of the orifice and is characterized by fins along the boundaries of the cut.

Figure 4:
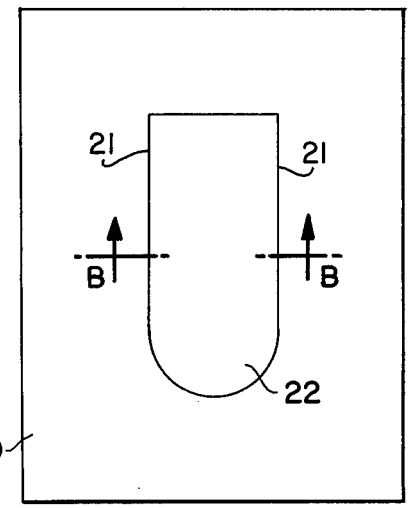
FIG. 4 is a top view of a steel slab which has been spot scarfed in accordance with the present invention.
Figure 5:
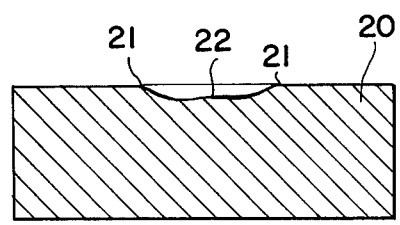
FIG. 5 is a cross-sectional view of FIG. 4 taken along lines B—B.

Accordingly, referring to FIGS. 4 and 5, when a workpiece 20 is scarfed in accordance with the present invention, the formation of fins caused by metal blown out of the scarfing reaction zone is almost entirely avoided along the boundaries 21 of the scarfing cut 22, thereby forming a smooth contoured cut.

Figure 6:
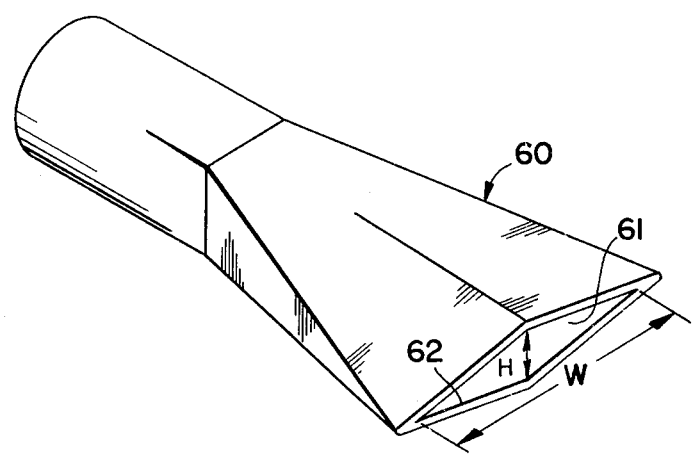
FIG. 6 is a perspective view of a preferred "diamond shaped" nozzle useful for practicing the present invention.

Referring to FIG. 6, a preferred converging-diverging, "diamond shaped" scarfing nozzle 60 is shown having a gas passageway 61 for cutting oxygen, terminating in discharge orifice 62. Unlike conventional circular or rectangular nozzles which produce a scarfing cut of from about 1.5 to 5 times wider than the nozzle orifice width W, the "diamond shaped" nozzle orifice produces a fin-free scarfing cut narrower than its discharge width W. The gradual diminution of nozzle orifice height H which characterizes the nozzles of the present invention is the critical feature which accounts for this narrow cut, and for the fact that molten metal which is carried beyond the cut bondaries during a scarfing pass is not permitted to solidify in a pure or unoxidized state. That is to say, fin formation is avoided by insuring that the oxygen stream discharged from the edges of a discharge orifice is just sufficient to oxidize the melt blown to the edges of the cut.

Figure 7:
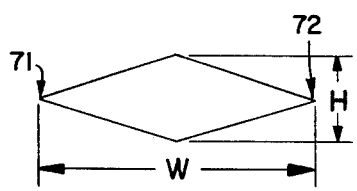
FIGS. 7, 8 and 9 illustrate the front face views of preferred nozzle orifices useful for practicing the present invention, since they are capable of producing fin-free spot scarfing cuts.

FIG. 7 illustrates, in front view, the "diamond shaped" discharge nozzle orifice shown in FIG. 6, wherein nozzle height H is at its maximum at the center of the nozzle and decreases linearly over the width W to zero at both of the edges 71 and 72.

Figure 9:
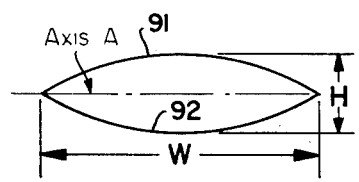

FIGS. 8 and 9 illustrate modifications of the "diamond shaped" orifice which are also effective for producing a fin-free cut. In FIG. 8 the orifice height H, relative to horizontal axis A, decreases linearly to zero along the upper surface 81 of the nozzle, while along the lower surface 82, height H decreases non-linearly, the lower surface 82 forming a uniform continuous curve. Alternatively, both the upper and lower surfaces 91 and 92 of the discharge orifice may be uniform curves such as shown in FIG. 9. In all cases, however, the ratio of orifice width W to orifice height H must remain within the range of from about 4:1 to 20:1 in order to produce the desired fin-free cut.

Figure 12:
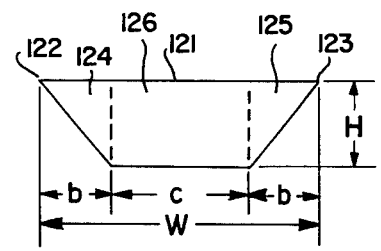
FIGS. 10-16 illustrate alternate shapes of discharge orifice useful for practicing the present invention.
Figure 10:
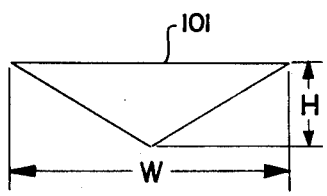
Figure 11:
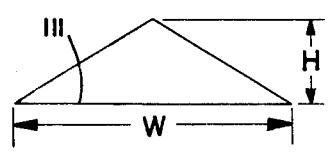

FIGS. 10, 11 and 12 depict other suitable geometric shapes for spot scarfing nozzle orifices wherein either the upper or lower surface of the discharge orifice 101, 111 and 121 respectively, is equal in length to the orifice width W. Triangular shaped orifices are shown in FIGS. 10 and 11, orifice height H being a maximum at the center and decreasing to zero at the edges of width W. To insure fin-free scarfing with nozzles having such triangular shaped orifices, a ratio of W/H of about 12:1 is most preferred. However, it has been experimentally determined that depending upon scarfing operating conditions, the ratio of W/H may vary from about 4:1 to 20:1 and still provide satisfactory results.

FIG. 12 is illustrative of another embodiment of the invention wherein the height H of the discharge orifice does not gradually decrease from the center to the edges 122 and 123, but rather, only from the end sections 124 and 125 corresponding to distance $b$ from the edges of the orifice. Thus, the orifice is comprised of a center section 126 corresponding to width $c$ wherein height H is constant, and two adjoining end sections 124 and 125 wherein the height gradually decreases to zero at the edges 122 and 123 of the orifice. Although the effect of geometry of the discharge orifice on the mechanics of fin formation on the scarfed surfaced is not fully understood, it is clear that the geometry of the orifice shape near the edges of the nozzle width W is critical. Thus, a conventional fin-producing rectangular shaped orifice can be converted to one which will scarf fin-free by having sloping end walls as shown in FIG. 12 such that the gradual decrease in orifice height occurs only by the end sections of width $b$. By so doing, however, the cut produced becomes narrower than the width W of the oxygen discharge nozzle orifice. In this configuration the ratio $b$/H is more critical than that of W/H. For an orifice having a maximum height H of ¼ inch, a $b$/H ratio of 6:1 was found to be effective. For significantly larger or smaller values of H, the optimum value of b/H is best determined experimentally. For most effective operation the ratio of b/H should be within the range of from about 2:1 to 10:1.

Figure 13:
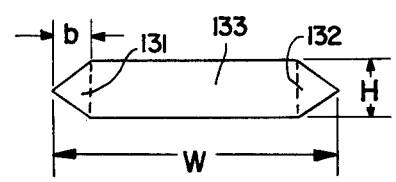
Figure 14:
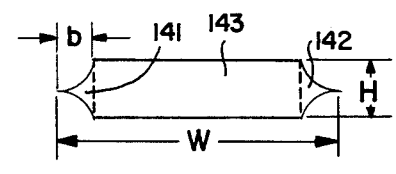

FIGS. 13 and 14 illustrate other orifice shapes in accordance with the invention wherein the decrease in orifice height occurs only in the end sections of width b, designated 131, 132, 141 and 142 respectively, and wherein the height H at the center sections 133 and 143 respectively, may be constant as shown, or even variable within limits, without promoting the formation of fins at the boundaries of the scarfing cut. In FIG. 13, height H decreases linearly to zero at the end sections, while in FIG. 14, height H decreases uniformly, but non-linearly at the end section. For most effective operation the ratio of b/H should be within the range of 2:1 to 10:1; the preferred orifice height H being ¼ inch.

Figure 15:
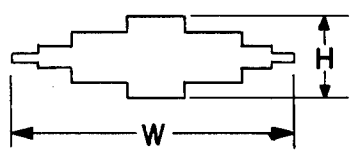
Figure 16:
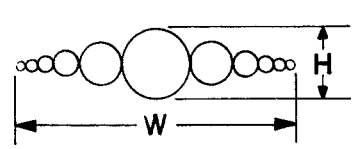

FIGS. 15 and 16 are illustrative of orifice shapes which are essentially equivalent, albeit less preferred, to the "diamond shaped" orifice and the modifications thereof illustrated in FIGS. 7, 8 and 9. Thus, in the discharge orifice shown in FIG. 15, the maximum height H of the opening decreases in abrupt steps, rather than uniformly or linearly, to substantially zero at the ends of the opening. While the resulting scarfing reaction is less stable with this orifice shape relative to a true "diamond shaped" orifice, nevertheless, the flow pattern of the oxygen stream can be sufficiently diminished in intensity toward the ends of the orifice to produce a fin-free scarfing cut, narrower than the nozzle width W, in accordance with the invention. Similarly, a series of closely spaced, variously sized thin walled circular orifices can be arranged in order of decreasing diameter from the center in the direction of the ends as in FIG. 16 so as to achieve a composite configuration having flow characteristics substantially similar to a "diamond shaped" orifice. As with the orifice shown in FIG. 15, this type of "composite" orifice, although not a preferred embodiment, is nevertheless capable of producing a fin-free spot scarfing cut in accordance with the invention.

What is claimed is:

1. In a process for machine scarfing individual defects from the surface of a metal body, wherein a sheet-like stream of oxygen is directed obliquely against a reaction zone of molten metal to produce a thermochemical reaction thereon, and wherein relative movement is produced between the oxygen stream and the metal surface in order to continue the reaction along the length of the metal surface and to produce the desired individual scarfing cut, the improvement comprising: preventing the formation of fins along the edges of the scarfing cut by restricting the flow of said oxygen at the edges of said stream so as to gradually diminish the intensity of the oxygen stream at the edges thereof to such an extent that the flow of oxygen at the edges of the stream is insufficient to produce a scarfing reaction on the metal surface but sufficient to oxidize any molten metal at the edges of the scarfing reaction zone thereby preventing said molten metal from solidifying and adhering to the surface of said metal body along the edges of the scarfing cut in an unoxidized state and producing a fin-free scarfing cut narrower than the width of the oxygen stream, and wherein the flow of oxygen at the edges of said stream is restricted by directing said stream of scarfing oxygen through a nozzle terminating in a discharge orifice characterized by having:
    a. a width greater than its maximum height, and said height gradually decreasing to zero at the edges thereof,
    b. a center section and two end sections, the ratio of the width of the end sections of the orifice to the height of said end sections being from about 2:1 to 10:1, and
    c. the center section of said orifice comprising parallel upper and lower edge surfaces.

2. The process in claim 1 wherein the ratio of orifice width to maximum height is from about 4:1 to 20:1.

3. The process in claim 1 wherein the ratio of orifice width to maximum height is about 12:1.

4. The process of claim 1 wherein the ratio of the width of the end sections of the orifice to the height of said end sections is about 6:1.

* * * * *